United States Patent [19]

Audras et al.

[11] Patent Number: 4,946,502
[45] Date of Patent: Aug. 7, 1990

[54] PROTECTIVE COATINGS FOR THE CARRIER BARS OF PRE-BAKED ANODES AND THE EMERGING PART OF THE ANODES

[75] Inventors: Gabriel Audras, Lyon; Bernard Samanos, Ste. Foy Les Lyon, both of France

[73] Assignee: Societe des Electrodes & Refractaires Savoie, Courbevoie, France

[21] Appl. No.: 426,200

[22] Filed: Oct. 25, 1989

Related U.S. Application Data

[63] Continuation-in-part of Ser. No. 272,907, Nov. 18, 1988, abandoned, which is a continuation-in-part of Ser. No. 118,023, Nov. 6, 1987, Pat. No. 4,787,965.

[30] Foreign Application Priority Data

Nov. 14, 1986 [FR] France .............................. 86 16285
Dec. 22, 1987 [FR] France .............................. 87 18452

[51] Int. Cl.⁵ .............................................. C04B 9/02
[52] U.S. Cl. .................................. 106/14.21; 252/387; 204/279; 204/280; 204/286; 204/290 R; 204/294

[58] Field of Search ................... 252/387; 106/14.11, 106/104, 14.05, 14.21; 204/290 R, 294, 279, 286, 280, 291; 501/100, 101, 104

[56] References Cited

U.S. PATENT DOCUMENTS 4,246,035 1/1981 Maczura et al. .................... 106/104

*Primary Examiner*—John F. Neibling
*Assistant Examiner*—Kathryn Gorgos
*Attorney, Agent, or Firm*—Dennison, Meserole, Pollack & Scheiner

[57] ABSTRACT

A coating composition is disclosed for protecting from corrosion and oxidation in the hot condition carrier bars of pre-baked anodes and the emergent carbonaceous part of the anodes for the protection of aluminum in the Hall-Heroult process. The composition consists essentially of dry matter formed by calcium alumnate cement having an alumina content of at least 70% and a low content of impurities, magnesium spinel, and optionally, further alumina, together with water in the amount of 10 to 80% by weight of the total dry matter.

6 Claims, No Drawings

PROTECTIVE COATINGS FOR THE CARRIER BARS OF PRE-BAKED ANODES AND THE EMERGING PART OF THE ANODES

This application is a continuation-in-part of Ser. No. 272,907, filed Nov. 18, 1988, now abandoned, which is a continuation-in-part of Ser. No. 118,023, filed Nov. 6, 1987, now U.S. Pat. No. 4,787,965.

BACKGROUND OF THE INVENTION

The invention concerns a coating for affording protection from corrosion and hot oxidation, which is intended for the carrier bars of pre-baked anodes and for the emerging carbonaceous part of such anodes which are used in tanks for the production of aluminum by the electrolysis of alumina dissolved in molten cryolite, using the Hall-Heroult process.

STATE OF THE ART

Most modern tanks for electrolytic production using the Hall-Heroult process use carbonaceous anodes which are referred to as being "pre-baked", being produced by shaping at a temperature of about 120° to 160° C. of a carbonaceous paste essentially formed by coke (and/or anthracite) and pitch, and then baking for around one hundred hours at 1150°/1200° C.

In the operation of shaping the paste, a certain number of cavities which are often referred to as "anode plugs" are provided in the upper part of the anode. Carrier bars (or steel plates) will be introduced into and sealed in the cavities, with the carrier bars or plates serving both to suspend the anode from the anodic frame structure and to supply it with current. The sealing effect is produced by casting cast iron or more rarely by means of a carbonaceous paste of special composition.

The steel carrier bars are subjected both to an elevated temperature and to the corrosive action of the fluorine-bearing effluents which are emitted by the tank in operation thereof. Furthermore, in certain operations, for example upon a downward movement of anodes which is intended to bring an end to an "anodic effect" or when there are "waves" in the electrolyte, molten cryolite bath may come into contact with the base of the steel carrier bars.

Those various phenomena cause the proportion of iron in the aluminum produced in the tank to be substantially increased by virtue of base corrosion of the carrier bars. That corrosion also has the harmful effect of reducing the service life of the anode suspension assembly (carrier bars+connecting bar members between the carrier bars and the anode stem), which is normally recovered and re-used after extraction of the worn-out anodes from the tank.

Likewise, the emerging part of the anodes, that is to say the upper part which, in normal operation of the electrolysis tank, is not immersed in the molten electrolyte, suffers from degradation due to combustion, which is sought to be prevented by a covering of solidified and crushed electrolysis bath which is optionally mixed with alumina, or else by metallization produced by spraying liquid aluminum.

The attempt has also been made to protect the base of the carrier bars by means of different processes such as metallization by spraying liquid aluminum or by fitting around the carrier bars a collar portion of aluminum which leaves a space of from 10 to 30 mm relative to the carrier bar (or the plate), the space being filled with a hot-cast carbonaceous paste. It has been proposed for that purpose to use conventional carbonaceous pastes (coke and/or anthracite and/or graphite+pitch) or more complex compositions comprising polymerizable and cokable organic substances such as epoxy resins, furfuryl resins, etc. (German patent application DE-AS No. 25 47 061).

However, those carbonaceous compositions suffer from the major disadvantage that, as soon as the anode is brought into operation, with the anode progressively reaching its equilibrium temperature, such compositions cause the production of hydrocarbon vapors originating from cracking of the carbonaceous paste. Some aromatic compounds which are formed in that way are suspected of having harmful physiological effects and in addition they cause pollution of and promote obstruction of the circuits for sucking off and washing effluents on the electrolysis tanks. For all those reasons, the "collar portion pastes" which are made up solely of carbonaceous substances no longer satisfy the operators of electrolysis tanks using pre-baked anodes. Now, the present day trend is precisely to produce a primary aluminum which is in as high a state of purity as possible in the tanks. Corrosion of the base of the carrier bars being one of the sources of iron in the aluminum produced, it was therefore important to find a way of affording effective protection and which preferably also applies to the emerging carbonaceous part of the anodes.

U.S. Pat. No. 4,787,965 is directed to a collar portion paste composition which does not suffer from the disadvantages of carbonaceous pastes and which provides for effective protection for the base of the steel carrier bars and optionally the emerging carbonaceous part of the anodes throughout the service life of the anodes (around 20 days on average). That composition is essentially characterized by a carbonaceous aggregate such as coke, artificial graphite, scraps from anodes or electrodes of semi-graphite with a low ash content (preferably <2%) which is bound by a calcium aluminate cement, with a low proportion of troublesome impurities ($SiO_2$, $Fe_2O_3$, $TiO_2$, $K_2O$, $Cr_2O_3$, with the total content preferably being lower than 1%), having an alumina content which is at least equal to 70% and preferably at least equal to 80%, the whole being bound by the addition of water.

Those impurities are referred to as troublesome as, when they are introduced into the electrolysis bath, they are reduced and the corresponding metals Si, Fe, Ti, Cr, Mn and K mix with the liquid aluminum.

A complementary addition of an anti-oxidant, such as Al powder of <0.1 mm, makes it possible to lower the temperature of the surface of the anode, thus retarding oxidation.

It is also possible to add alumina to the paste, for example alumina for electrolysis or spherical alumina, in a proportion which may constitute up to 50% of the total weight of the aggregate.

The proportion by weight of cement, expressed as a percentage by weight of the aggregate (carbonaceous substance, alumina, additives) is between 10 and 60% and preferably from 15 to 50%.

To protect the emerging part of the anode, the same compositions are suitable but it is then preferable for them to be applied by gun spraying. For that purpose, depending on the type of gun used, it is necessary to control the granulometry of the aggregate and the cement (less than 1 mm and preferably less than 0.5 mm) and substantially increase the amount of water.

That amount of water will be fixed for example at between 10 and 70% by weight with respect to the dry matter (aggregate+cement) for use in the form of a collar portion paste and up to 60% by weight for use in the form of a fluid paste to be sprayed with a gun.

SUMMARY OF THE INVENTION

The subject matter of the present invention is a protective composition which does not suffer from the disadvantages of carbonaceous pastes or pastes comprising a carbonaceous aggregate, and which provides for effective protection of the base of the steel carrier bars and possibly the emerging carbonaceous part of the anodes throughout the service life of the anodes (around twenty days on average). The composition consists essentially of a mixture of (1) calcium aluminate cement, with a low proportion of troublesome impurities ($SiO_2$, $Fe_2O_3$, $TiO_2$, $K_2O$, $Cr_2O_3$) with the total lower than 5% and preferably lower than 1%, and having an alumina content which is at least equal to 70% and preferably at least equal to 80%, by weight, and (2) magnesium spinel in a proportion of from 0.2 to 10% by weight. It is also possible to add alumina in the form of fine powder in a proportion which may attain 90% of the dry matter. The compositions covered by the invention therefore fall within the following ranges:

| Dry matter: | |
|---|---|
| calcium aluminate cement | 10 to 99.8% by weight |
| alumina in fine powder form <0.5 mm | 0 to 90% |
| magnesium spinel <0.1 mm | 0.2 to 10% |

The water content may be between 10 and 80% of the weight of dry matter, contents between 10 and approximately 50% corresponding to a pasty composition which can be used as a collar portion paste, while contents ranging up to 80%, for example 60–80%, correspond to a fluid paste which can be used by gun spraying, in which case the granulometry of the dry matter is less than 1 mm and preferably less than 0.5 mm.

DETAILED DESCRIPTION OF THE INVENTION

Protection for the Emerging Part of the Anodes

The protective coating for the emerging part of prebaked anodes was employed using the following four formulations A-D (in parts by weight) for application by gun spraying, which are adapted by reducing the water content for use as a paste for collar portions.

| | SECAR | $Al_2O_3$ | Magnesium Spinel | $H_2O$ |
|---|---|---|---|---|
| A | 18 | 29 | 3 | 38.7 |
| B | 29.2 | 25.1 | 5 | 38.7 |
| C | 35.9 | 13.4 | 10 | 38.7 |
| D | 61.3 | 0.1 | 0 | 38.7 |

The spraying conditions are as follows: the carbonaceous substrate for the tests is formed by a core portion of a diameter of 30 mm and 120 mm in height.

The different compositions A, B, C and D are applied to a group of samples and a certain number of reference samples are kept without a coating. The array of samples is treated for one hour at 1000° C. in nitrogen to remove any trace of water. A carboxy reactivity test is then carried out for two hours at 1000° C. in a flow of $CO_2$ of 50 liters/hour. At the end of the test, the samples are cooled in a stream of nitrogen and each core portion is weighed to determine its weight loss. The results are expressed in milligrams in relation to a surface area of 1 $cm^2$ and a period of one hour. The result is, therefore, given in $mg.cm.^{-2}.h^{-1}$. The results obtained were as follows:

| | Core portions covered by spraying |
|---|---|
| A | 36 |
| B | 36 |
| C | 38 |
| D | 38 |
| Reference samples (without coating) | 47 |

The particular level of effectiveness of formulations A and B will be noted, reducing reactivity in relation to $CO_2$ by close to 25%.

Thus, one preferred composition will contain about 15–30 parts by weight cement, about 20–30 parts $Al_2O_3$ and about 3–6 parts Mg spinel.

Long-term tests were carried out under industrial conditions on the emerging part of the anodes of a certain number of Hall-Heroult electrolysis tanks. The results are less precise by virtue of the fact that, after the stumps of worn-out anodes are withdrawn from the tank, they are coated with electrolysis bath which can never be entirely removed therefrom, but they confirm the order of magnitude of 25% in the reduction of oxidation of the emerging part of pre-baked anodes.

Protection for the Carrier Bars of Pre-baked Anodes

For protecting anode carrier bars, the protective coating is set in position in the form of a paste. The conditions in respect of corrosion in the course of electrolysis are difficult to simulate so that tests were carried out under real conditions, by measuring the reduction in diameter of the carrier bars after removal of the worn-out anodes (after a period of about three weeks in the electrolysis tank).

The compositions for this use fall within the following ranges (% by weight):

| Cement: | 20 to 99.8% |
|---|---|
| Alumina: | 0 to 80% |
| Mg spinel: | 0.2 to 10% |

The optimum compositions expressed in terms of the weight ratio of Secar cement/Secar cement+$Al_2O_3$+spinel are between 20 and 50%. The percentage of water to be added depends on the cement content and the granulometry of the alumina. It is between 30 and 50% and preferably between 35 and 45% by weight with respect to the dry matter (35 to 45 grams of water for 100 grams of the Secar cement+alumina+magnesium spinel mixture).

The reduction in corrosion of the anode carrier bars is apparent as from the first cycle and becomes more accentuated in the course of the following cycles. It can be estimated that the useful service life of the anode carrier bars is extended by at least 30%.

Although the invention has been described in the particular situation of using Secar cement, it applies in the same manner to any calcium aluminate-based cement with an alumina content that is at least equal to 70% and preferably at least equal to 80%. Set out below are the compositions of the Secar 80 and 71 cements from LAFARGE FONDU INTERNATIONAL and spinel from PEM (PECHINEY ELECTROMETALLURGIE):

|  | SECAR 80 |  | SECAR 71 |  | SPINEL |
|---|---|---|---|---|---|
| $Al_2O_3$ | 80.5% | } 98.5% | 71% | } 98% | 67–71% |
| CaO | 18.0% | | 27% | | ≦0.5 |
| $SiO_2$ | 0.20% | } 0.43% | 0.35% | } 0.72% | ≦1.0 |
| $Fe_2O_3$ | 0.15% | | 0.25% | | 0.16 |
| $TiO_2$ | 0.03% | | 0.05% | | — |
| $K_2O$ | 0.03% | | 0.05% | | — |
| $Cr_2O_3$ | 0.01% | | 0.01% | | — |
| $Mn_2O_3$ | 0.01% | | 0.01% | | — |
| MgO | 0.1% | | 0.2% | | 28–31% |
| $Na_2O$ | 0.25% | | 0.35% | | — |
| $SO_3$ | 0.1% | | 0.15% | | — |
| $P_2O_5$ | trace | | — | | trace |
| $B_2O_3$ | — | | — | | trace |

What is claimed is:

1. A coating composition for protecting from corrosion and oxidation in the hot condition carrier bars of pre-baked anodes and the emergent carbonaceous part of the anodes for the production of aluminum in the Hall-Heroult process, consisting essentially of:
   (a) dry matter consisting essentially of, by weight,
       10–99.8% calcium aluminate cement having an alumina content of at least 70% and a total content of impurities of $SiO_2$, $Fe_2O_3$, $TiO_2$, $K_2O$ and $Cr_2O_3$ less than 5%,
       0.2 to 10% magnesium spinel, and
       0 to about 90% further alumina; and
   (b) 10 to 80% by weight of the total dry matter of water.

2. A coating composition according to claim 1, wherein said further alumina is in the form of a fine powder of grain size smaller than about 0.5 mm.

3. A coating composition according to claim 1 or claim 2 for application by spraying to the emerging part of pre-baked anodes, consisting essentially of:
   dry matter 100 parts by weight, and water 10 to 80 parts by weight.

4. A composition according to claim 3, comprising 60–80 parts by weight of water.

5. A coating composition according to claim 1, for application in the form of a collar portion paste to anode carrier bars, consisting essentially of:

| dry matter consisting essentially of, by weight, | |
|---|---|
| calcium aluminate cement: | 20–99.8% |
| alumina in fine powder form: | 0–about 80%, and |
| magnesium spinel: | 0.2 to 10%, and |
| water | 30 to 50% of the weight of the dry matter. |

6. A composition according to claim 5, comprising 20 to 50% by weight of calcium aluminate cement.

* * * * *